UNITED STATES PATENT OFFICE.

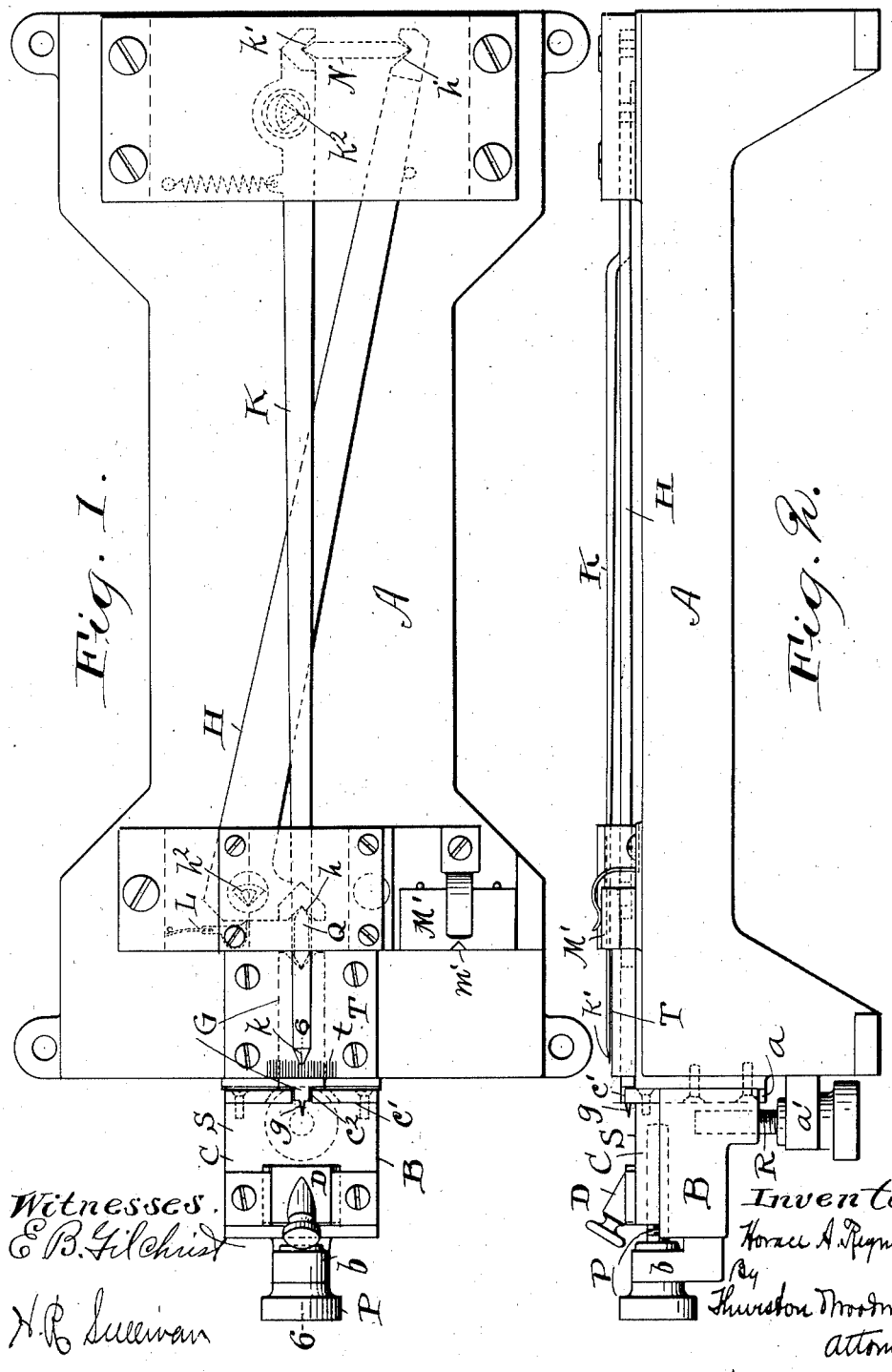

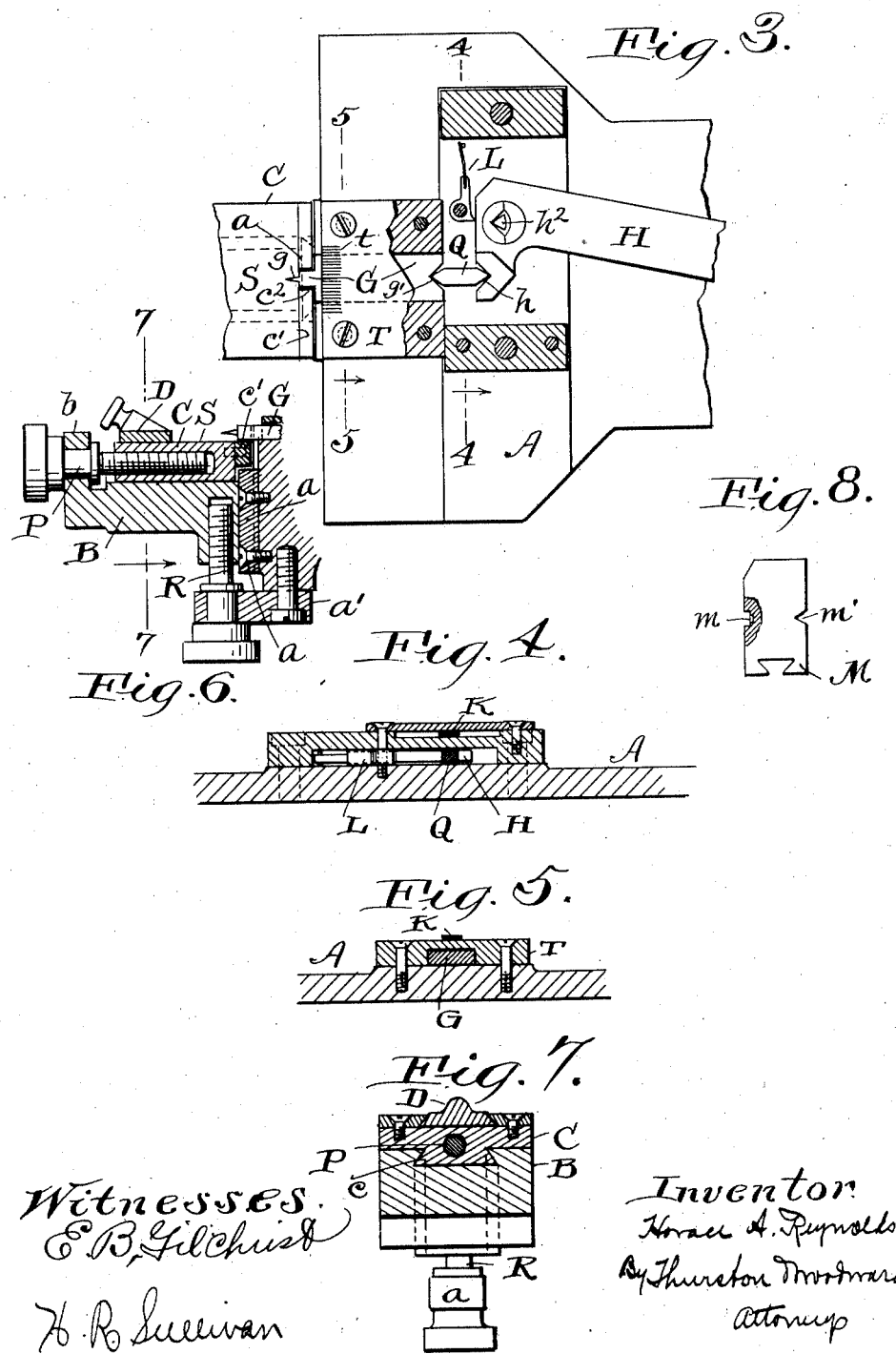

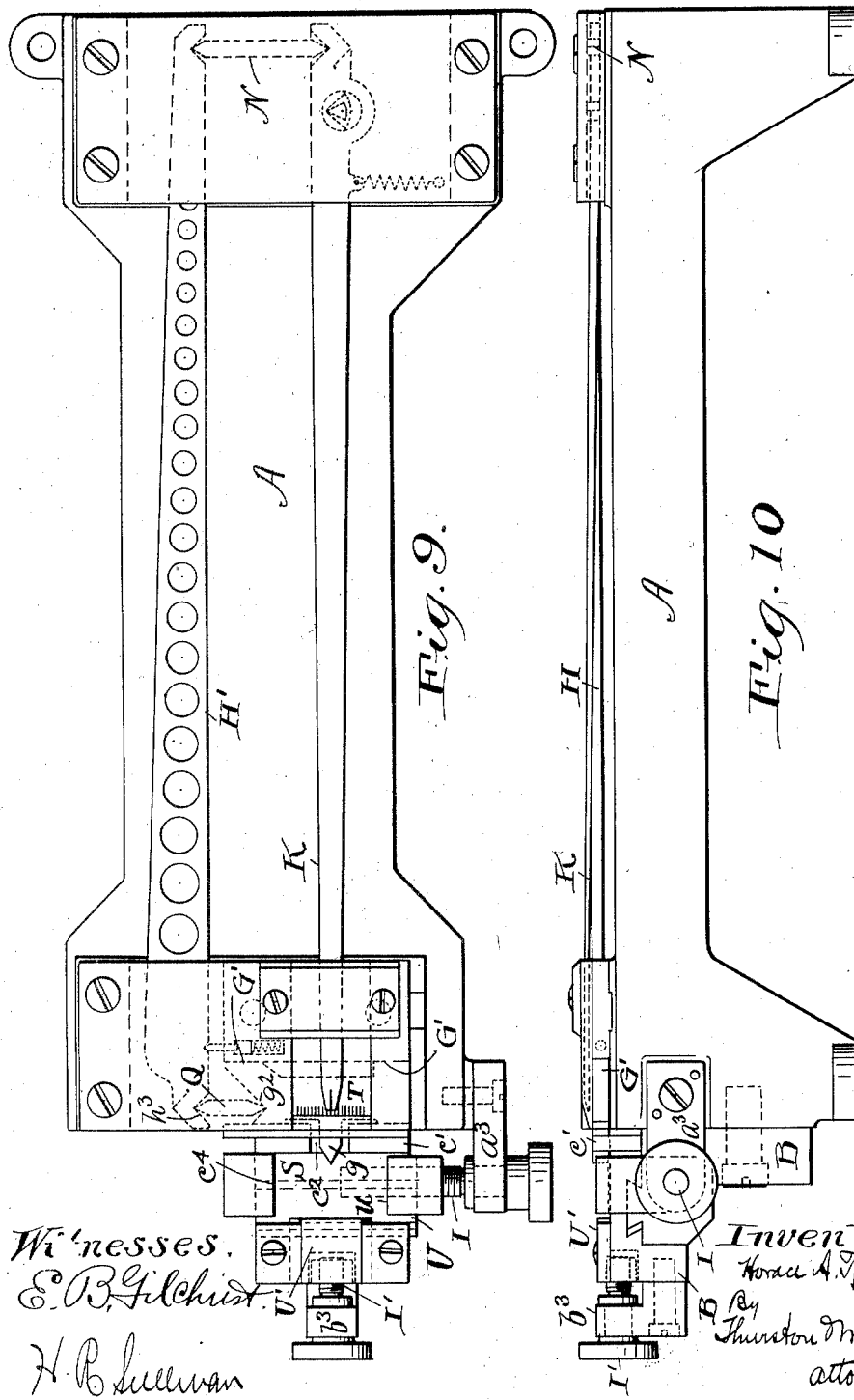

HORACE A. REYNOLDS, OF WOONSOCKET, RHODE ISLAND, ASSIGNOR TO ELECTRIC COMPOSITOR COMPANY, OF NEW YORK, N. Y., A CORPORATION OF NEW JERSEY.

INDICATOR-GAGE.

No. 864,861.   Specification of Letters Patent.   Patented Sept. 3, 1907.

Application filed January 16, 1907. Serial No. 352,617.

*To all whom it may concern:*

Be it known that I, HORACE A. REYNOLDS, residing at Woonsocket, in the county of Providence and State of Rhode Island, have invented a certain new and useful Improvement in Indicator-Gages, of which the following is a full, clear, and exact description.

In the manufacture of matrices it is required that certain depressions in the edges thereof shall be absolutely uniform in respect to depth. This is especially true in respect to the character depressions, and it is also true in respect to certain V-shaped alinement notches which some matrices have. Moreover, it is necessary that these V-shaped alinement notches be placed in uniform positions in respect to the bottoms of the matrices.

The primary object of the present invention is to provide a practical gage with which to determine whether such depressions are of the correct depth. Certain features of the invention are, however, adapted for use in a gage especially organized for determining the variations in the positions of such V-shaped alinement notches. Of course, the principal purpose for which such gages are used is to determine when and how to set or readjust the mechanism with which said depressions are formed.

The invention consists of the combinations of parts shown in the drawing and hereinafter described and pointed out definitely in the claims.

In the drawings Figures 1 to 7 show the invention embodied in a gage especially adapted for measuring the depth of depressions in the edges of the matrices; and Figs. 9 and 10 show the invention embodied in a gage especially adapted for determining whether V-shaped notches in the edges of matrices are properly located and of the required depth.

In the drawings, Fig. 1 is a plan view, and Fig. 2 is a side elevation of a depth gage embodying the invention. Fig. 3 is a plan view, partly broken away and sectioned, of certain parts thereof near the reading scale. Fig. 4 is a vertical sectional view in the plane of line 4—4 of Fig. 3. Fig. 5 is a vertical sectional view of a part of said gage in the plane of line 5—5 on Fig. 3. Fig. 6 is a vertical sectional view in the plane of line 6 of Fig. 1. Fig. 7 is a vertical sectional view in the plane of line 7—7 on Fig. 6. Fig. 8 is a view partly broken away of a matrix such as the gage is designed to test. Figs. 9 and 10 are respectively a plan, and a side elevation of a modification of the invention designed especially for use as a position gage for determining whether or not the V-shaped notches are correctly located and formed.

Directing our attention, first, to Figs. 1—7 and the embodiment of the invention therein shown, A represents what may be called the base of the gage. At one end of this base is a shelf bracket B which carries a horizontal seat S adapted for the support of the matrices to be tested. These matrices are of various thicknesses, wherefore it is desirable that this bracket shall be vertically adjustable so that the center of the depressions in the edges of the matrix M may be brought into alinement with the gage point $g$. As shown, there is a vertical dove-tailed tongue $a$ Fig. 3 on the front end of the base A, and this tongue is fitted to a corresponding vertical groove on the bracket B. An adjustment screw R, which is rotatably mounted in a bracket $a'$ secured to the base, screws into the bracket B. This screw has no endwise movement in the bracket $a'$, and therefore as it is turned it moves the bracket shelf B up or down as required to bring the bottom of the depressions in a matrix M upon seat S in line with the gage point $g$.

On the top of the bracket shelf B is a dove-tailed groove which receives a dove-tailed tongue $c$ Fig. 7 on the under side of a slide C, which is supported upon said bracket shelf. A screw P, which is rotatably mounted in a flange $b$ on the bracket B, but which has no endwise movement in its bearings, screws into this slide and furnishes the means for nicely adjusting its position relative to the gage point. On the rear end of this slide is a flange $c'$ whose front vertical edge serves as the base plane against which to force the edges of the matrices in order to determine the depths of the depressions. The adjustment of the slide C is, of course, for the purpose of bringing this base plane on the flange $c'$ into proper relation with the gage point. A matrix to be tested is laid upon shelf S, which in the exemplification of the invention shown, is the top of this slide so that the depressions to be measured are in line with the gage point $g$, and then the matrix is pushed rearward until its edge engages with said flange $c'$. Upon the top of the slide is a pressure slide D mounted in suitable guide ways whereby it must move at exactly right angles to said flange; and it is by the movement of this pressure slide that the matrix is pushed against said flange, as described. The gage point $g$ is fixed to and projects forward from a slide G mounted in a suitable guide way upon the base A. It extends over the seat S and through a notch $c^2$ in flange $c'$. It is under the influence of a spring L tending to push it forward against a stop, which may be the rear side of flange $c'$. When a matrix M upon the seat S is moved back against the flange $c$, and the gage point projects into the depression $m$, whose depth is to be measured, this gage point $g$ and the slide G to which it is attached is moved backward a greater or less distance, and comes to rest in the position which is determined by the depth of the depressions. The variation in the position of this slide G from the required position indicates, of course, the variation in the depth of the depression; but this variation is so slight that, unless it be multiplied, it cannot be satisfactorily read. The device, therefore, contains multiplying levers, to wit, the horizontally movable lever H, which is pivoted on a knife edge $h^2$ to the base plate; and it has a V-shaped notch $h$ opposed to a V-shaped notch $g'$ in the slide G. A knife bar Q engages at its sharpened ends with these notches, and thereby the movement of the slide G is transmitted to the lever H. The spring L before mentioned acts upon the lever to maintain this engagement and to impart to the slide G a tendency to forward movement. The other lever K is pivoted near the rear of the base plate on a knife edge $k^2$, and its rear end is provided with a V-shaped notch $k'$, and the rear end of the lever H is provided also with a V-shaped notch $h'$. A knife bar N lies between the rear ends of these levers with its sharpened ends in engagement with the said notches. The front end of the lever K lies over a plate T, on which is a graduated scale $t$ adapted to be read in connection with a graduation $k$ on the end of lever K.

The operation of the device will be readily understood. A matrix M' having its depressions made accurately in accordance with the standard may, first, be used in order that the parts may be properly adjusted, and particularly that the flange $c'$ may be properly adjusted with respect to the gage point. That is to say, the parts are so adjusted that when this standard matrix is upon the slide C, and in contact with the flange $c'$ the lever K will be at the zero point. When other matrices are put in the machine and pressed against said flange $c'$ the lever K will, by its position, indicate whether the depressions are of the proper depth, or whether the depressions are too deep or too shallow, and how much they are too deep or too shallow.

In the embodiment of the invention shown in Figs. 9 and 10, there is a slide G' carrying a V-shaped gage point $g$. This slide is movable in a direction at right angles to the direction in which the slide G moves, as shown in the other embodiment of the invention. In one end of this slide G is a V-shaped notch $g^2$ which receives one pointed end of the bar Q, the other pointed end of said bar engaging in a corresponding V-shaped notch $h^3$ in the side of the lever H'. This embodiment of the invention includes another lever K similar to the lever K in the other figures; and motion is transmitted to this lever K from lever H' by substantially the same means and mechanism shown for this purpose in the other figure, to wit, a bar N pointed at both ends lying between and engaging in V-shaped notches in the two levers. In this embodiment of the invention two slides U; U' are mounted upon the bracket B. The slide U, which is supported upon the under side of the shelf of bracket B, is movable in a path parallel with the path in which the plate G' moves; and the slide U may be so moved by means of a screw I, which screws into said slide and is rotatably mounted in a fixed arm $a^3$ in which said screw has no endwise movement. The seat S for the matrix may be the top surface of this bracket B. This slide U has a shoulder $u$ which may bear against the end of the matrix resting upon said seat, and thereby push the matrix against a fixed flange $c^4$. This embodiment of the invention also includes a fixed flange $c'$ in which is the notch $c^2$ through which the gage point $g$ projects over said seat S. The slide U' is movable over said seat toward and from flange $c'$ and may be so moved by a screw I' which screws into it and is rotatably mounted in an arm $b^3$, said arm being fixed to the bracket B and the screw having no endwise movement therein. This embodiment of the invention is for the purpose of testing the position, shape and depth of the V-shaped notches $m'$ in the edges of the matrix. In order to so use it, a matrix is laid upon the seat S and is moved by slide U' so that its notched edge is brought into contact with the flange $c'$. The gage point $g$ enters V-shaped notch. The matrix is then moved by means of screw I until one end thereof comes into contact with the flange $c^4$. The resultant position of the gage point $g$ and the slide G' to which it is secured indicates whether or not the V-shaped notch is properly located and formed. Over this slide G' there is a graduated plate T, with which a lever K coöperates,—said plate and lever being like those shown in the other embodiment of the invention.

Having described my invention, I claim:

1. In a gage, the combination of a horizontal seat for a matrix to be tested, and a fixed flange adjacent to the seat and adapted to be engaged by one edge of a matrix resting upon said seat, said flange having a notch through it, with a horizontally movable slide having a gage point projecting over said seat and through the notch in said flange, and indicating apparatus operatively connected with said slide.

2. In a gage, the combination of a horizontal seat for a matrix to be tested, and a fixed flange adjacent to the seat and adapted to be engaged by one edge of a matrix resting upon said seat,—said flange having a notch through it; with a horizontally movable slide having a gage point projecting over said seat and through the notch in said flange, a fixed graduated plate adjacent to said flange, a pivoted gage lever movable across the graduations on said plate, and multiplying mechanism for transmitting motion from the slide to said lever.

3. In a gage, the combination of a horizontal seat for a matrix to be tested, and a fixed flange adjacent to the seat and adapted to be engaged by one edge of a matrix resting upon said seat, said flange having a notch through it, with a slide having a gage point projecting over said seat and through the notch in said flange, indicating apparatus operatively connected with said slide, and means for adjusting said seat up and down to adapt the device for use with different kinds of matrices.

4. In a gage, the combination of a base, a bracket supported thereby, and means for adjusting said bracket vertically relative to said base, a seat upon said bracket for supporting a matrix to be tested, a flange adjacent to the seat and adapted to be engaged by one edge of a matrix upon said seat,—said flange having a notch through it; a slide movably mounted upon the base and having a gage point projecting over said seat and through the notch in said flange, and indicating mechanism operatively connected with said slide.

5. In a gage, the combination of a base, a bracket supported thereby, and means for adjusting said bracket vertically relative to said base, a seat upon said bracket adapted for supporting a matrix to be tested, a flange adjacent to the seat, adapted for engagement by one edge of a matrix resting upon said seat, and having a notch through it, a slide movably mounted upon the base and having a gage point projecting over said seat and through the notch in said flange, indicating mechanism operatively connected with said point, and a pressure slide mounted upon said bracket and movable horizontally in a path at right angles to the said face of said flange and adapted to press a matrix, resting upon said seat against said flange.

6. In a gage, the combination of a base, a vertically adjustable bracket having on its top a seat for a matrix to be tested, a fixed flange adjacent to the seat and having a notch through it, a slide mounted upon the base and having a gage point projecting over said seat through the notch in said flange, a horizontal graduated plate located directly over said slide, a horizontally movable gage lever mounted upon and pivoted to said base and having its free end arranged to swing across said graduated plate, a multiplying lever mounted on said base and operatively connected with said slide and adapted to be moved thereby, and means transmitting motion from said multiplying lever to said gage lever.

7. In a gage, the combination of a base, a vertically adjustable bracket supported on one end thereof, a horizontally adjustable plate upon the top of said bracket and carrying a flange in which there is a notch, means for adjusting the bracket vertically and the plate horizontally, a horizontally movable slide mounted upon the base and having a gage point projecting through the notch in said flange, and indicating mechanism operated by said slide.

In testimony whereof, I hereunto affix my signature in the presence of two witnesses.

HORACE A. REYNOLDS.

Witnesses:
G. L. HAMMOND,
T. L. CLARK.